United States Patent [19]

Miller

[11] 4,017,986
[45] Apr. 19, 1977

[54] ROOM PLANNING KIT

[76] Inventor: Charles Miller, 3319 Lonefeather Crescent, Mississauga, Ontario, Canada

[22] Filed: Apr. 5, 1976

[21] Appl. No.: 673,959

[52] U.S. Cl. .................................. 35/16; 35/7 A; 46/1 L; 46/241
[51] Int. Cl.² ........................................ G09B 19/00
[58] Field of Search ...................... 35/7 R, 7 A, 16; 46/1 L, 241

[56] References Cited

UNITED STATES PATENTS

| | | | |
|---|---|---|---|
| 2,317,124 | 4/1943 | Adams | 35/16 |
| 2,600,505 | 6/1952 | Jones | 35/7 A UX |
| 2,941,314 | 6/1960 | Schwieger | 35/7 A X |
| 3,012,336 | 12/1961 | Brown | 35/7 R |

FOREIGN PATENTS OR APPLICATIONS 823,868 11/1959 United Kingdom ................. 35/7 R Primary Examiner—Harland S. Skogquist
Attorney, Agent, or Firm—Robert D. Farkas

[57] ABSTRACT

This disclosure pertains to a room planning kit comprising a lateral surface possessing magnetic properties to be used in combination with a plurality of three dimensionally shaped furniture miniatures which may be folded up after first having been torn out of a book which contains a wide variety of the furniture types to be utilized in planning a particular type of room. The book also contains a number of perforated sections representing the horizontal projection of each type of foldable furniture devices therewithin. Both three dimensional furniture legs and the horizontal projection elements are adapted with magnetically sensitive substances printed on their lowermost surfaces enabling them to be located and relocated with great convenience, upon the surface of the planning grid and plate sections therebelow.

10 Claims, 3 Drawing Figures

ROOM PLANNING KIT

BACKGROUND OF THE INVENTION

1. Field of the Invention

This invention relates to room planning kits and more particularly to that class adapted to provide magnetic mounting means for three dimensional furniture.

2. Description of the Prior Art

Room planning kits, in a wide variety of forms, have been available heretofore. U.S. Pat. No. 3,012,336 issued Dec. 12, 1961 to D. C. Brown teaches a method of placing flat sections of furniture miniatures upon a lowermost grid and pictorial replicas of the vertical view of identical furniture to scale, about the edge of the room model to the planned. In this fashion, the planner may obtain a visual representation of each of the walls of the room to be planned whilst simultaneously being enabled to visualize the amount of space consumed by each furniture element. U.S. Pat. No. 2,984,020 issued May 16, 1961 to S. Levitas shows a method utilizing orthogonal techniques in which furniture replicas, in three dimensional form, are secured to a plate having orthogonal lines thereupon. It is an object of this invention to enable the room planner to simultaneously obtain a pseudoperspective view of the room furniture elements and the areas occupied thereby by reference to the orthogonal grid scaled beneath the furniture elements. U.S. Pat. No. 2,941,314 issued June 21, 1960 to O. J. Schweiger shows the conventional flat room planning technique in which all the room elements are flat two dimensional cutouts scaled in proportion to the furniture depicted thereby. The elements are secured to the lowermost planning plate by magnets affixed to each of the individual elements, acting as pedestals or bases. An attempt is made to create a three dimensional effect by elevating each of the flat furniture projections a distance representing the thickness of the fastening permanent magnet therebelow. All of the aforesaid patented methods do not accurately provide the planner with a true three dimensional view of the furniture models employed. Such a view is indispensable in gaining insite into the practical location of furniture in homes and office equipment in offices and the like.

SUMMARY OF THE INVENTION

A primary object of the instant invention is to provide a kit enabling the room planner to obtain a three dimensional view of the furniture models utilized in the planning process.

Another object is to provide a furniture model which can be stored and sold in flat form and easily assembled into a three dimensional shape.

Still another object is to provide a mating flat two dimensional representation of the horizontal projection of each piece of furniture being depicted by a fold up version into a three dimensional shape.

Yet another object is to provide three dimensional and two dimensional furniture models with magnetically sensitive surfaces, permitting thereby, convenient and relocatable mounting facility to a magnetically sensitized mounting plate.

A further object is to provide a kit having therein a number of ruled grid-like spacable elements containing perforations along the grid lines which facilitate convenient and rapid sizing of the grid to a scale representing accurately the dimensions of the room to be planned.

Another object is to provide a book containing all the elements for a particular type of room to be planned such that each element may be removed from the book by perforations along the marginal edges of the furniture elements therein.

Still another object is to provide a magnetic planning surface adapted to be used in combination with a number of books, each of whom is styled to contain the furniture elements compatible with a variety of room styles to be planned.

The room planning kit herein disclosed comprises a rectangular plate having permanent magnets affixed therein or another construction providing a sensibly uniform magnetic field upon the uppermost lateral surface. The kit further includes a number of books, each styled to contain furniture replicas for the type of room to be planned. Thus, a room planning book will include typically a variety of bed sizes and shapes, a variety of dressers, tables, and the like. Similarly, an office planning book would include office desks, filing cabinets, stenographic chairs, etc. Each book, regardless of the style of the furniture contained therein, also contains a number of rectangularly scaled lines upon a flexible surface whose edges are adapted with perforations, permitting the scaled sheet to be torn directly from the pages of the book. Further perforations extend along the length of each of the scaled lines enabling the user to trim the sheet to dimensions representing the size of the room to be planned. Other pages contain flat representations of three dimensional furniture elements. Perforations permit the entire three dimensional element to be withdrawn from the book and upon folding, to enable the user to create a three dimensional scaled replica of the given type of furniture to be utilized in the planning process. The lowermost surfaces of the folded up three dimensional furniture replica is adapted with a magnetically sensitive surface printed thereupon, such as ferrous particles similar to the type utilized in electromagnetic tape reproducing elements within cassettes. Each three dimensional furniture replica has score lines along the lines which are to be utilized in folding the furniture into a three dimensional shape, facilitating thereby, convenient assembly in three dimensional form.

Each three dimensional replica has a matching two dimensional perforated section which represents the horizontal projection of the furniture. This two dimensional shape is similarly adapted with a magnetically sensitive surface facilitating simple location and relocation upon the magnetic planning board. The user may, first plan the room utilizing the two dimensional elements so as to more rapidly obtain an initial crude overview of the location of the furniture. Following this initial step, the planner may then proceed to replace each two dimensional element with the folded up version of the three dimensional furniture. The planner may then view from any angle, the effect created by the placement of the three dimensional furniture replicas enabling a clear visual understanding of the room plan thus created.

These objects, as well as other objects of this invention, will become readily apparent after reading the following description of the accompanying drawings.

DESCRIPTION OF THE PREFERRED EMBODIMENT

The structure and method of fabrication of the present invention is applicable to a room planning kit comprising a rectangular hollow container having at its base a lateral surface possessing substantially uniformly magnetic properties of the permanent magnet variety. The kit further includes a looseleaf or spiral type bound book containing therein, a number of pages which have thereupon two basic styles of furniture replicas. One style of replica shows the horizontal projection of each type of furniture to be included within the book. The scale of each of the two dimensional furniture replicas match the scale of rectangular grid lines contained on other pages in the book. Still other pages of the book contain the other variety of furniture which is adapted to be folded up into a three dimensional shape. All the elements representing furniture in any form and the grid lined paper air in the scale. All the furniture elements are provided with magnetically sensitive surfaces printed on their reverse unexposed sides or on the elements which will comprise the feet of the furniture replicas when in the folded up position. The grid sheets are not adapted with magnetic properties and are of minimum thickness so as not to impede the magnetic attractive forces provided by the base of the kit box.

Each style of furniture replica has perforations about the peripheral edges permitting thereby rapid and convenient removal from the pages of the book containing them. Similarly, the ruled lines comprising the grid planning sheets contain perforations therewithin facilitating trimming to the exact scale size for each room to be planned. The kit box is provided with a cover which enables the room planner to store the book and any furniture replicas torn therefrom to be stored conveniently.

Figure 1:
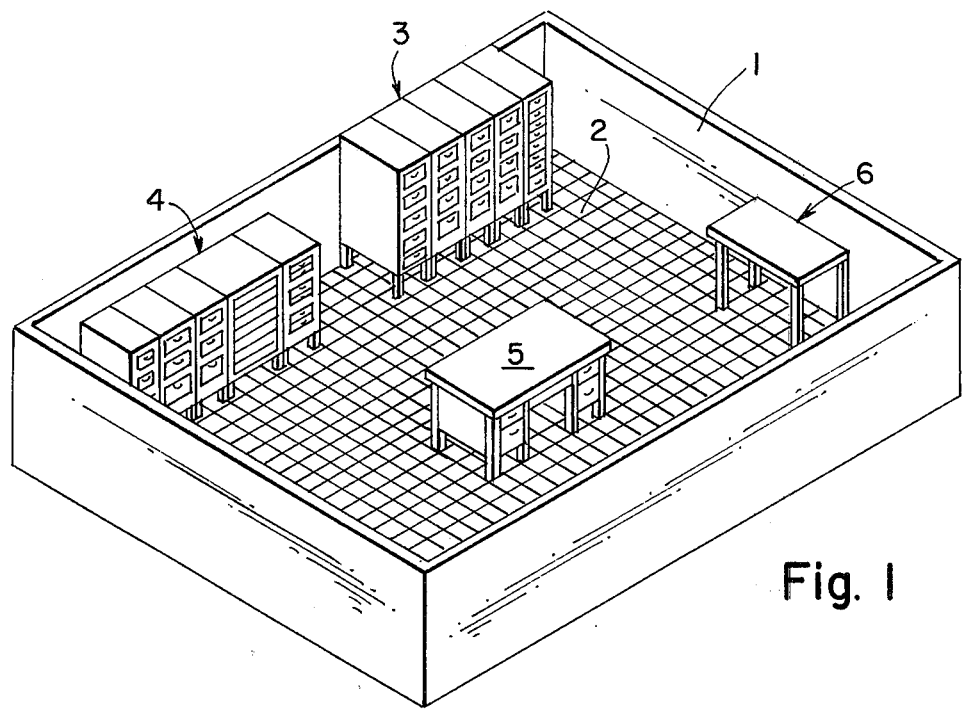
FIG. 1 is a perspective view of the furniture planning kit elements assembled in three dimensional shapes and placed upon rectangularly ruled grid element located on the floor of the box in which the kit is supplied.

Now referring to the Figures, and more particularly to the embodiment illustrated in FIG. 1 showing a room planning kit box 1 containing therewithin a grid scale drawn upon a lateral paper-like surface 2 located upon the floor thereof. The lowermost surface of the kit box 1, not shown, possesses magnetic properties attracting magnetically sensitive materials towards the grid scale 2. Furniture elements in the form of file cabinets 3 and drawers 4 and a desk 5 and a table 6 are depicted in three dimensional form resting upon the grid surface 2.

Figure 2:
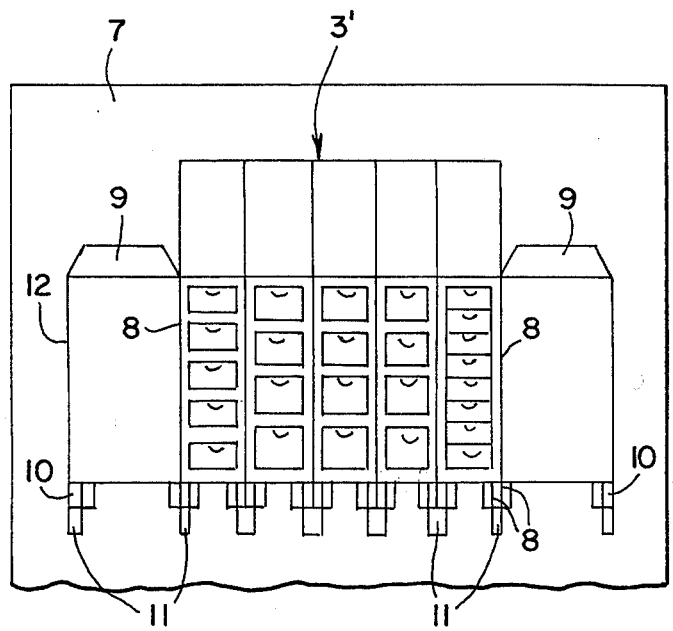
FIG. 2 illustrates the plan view of a portion of a sheet containing therewithin the flat representation of three dimensional filing cabinets.

FIG. 2 illustrates a sheet 7, containing therewithin, a unfolded up version of the filing cabinets 3 as shown in FIG. 1. The flat version 3' is illustrated with fold lines 8, flaps 9, and legs 10. Tabs 11 are affixed to the legs 10 and are provided with a magnetically sensitive surface thereon. Perforations 12 run along the extreme marginal edges of the unfolded furniture model 3' permitting the furniture replica to be torn from sheet 7 without utilizing scissors or other tools. Flaps 9 may be provided, if desired, with adhesive surfaces facilitating their convenient fastening to the surfaces to which they are designed to later attach upon folding up the model into a three dimensional shape.

Figure 3:
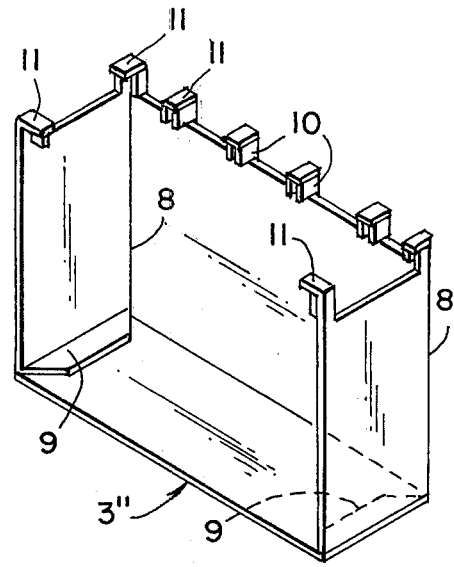
FIG. 3 illustrates a perspective view of the furniture replicas of a group of filling cabinets depicted in FIG. 2 when in an assembled three dimensional shape.

FIG. 3 illustrates the folded up version 3" of the two dimensional unfolded furniture replica 3' as shown in FIG. 2. Flaps 9 have been folded over and engage the undermost surface of the top of the filing cabinet represented thereby. Legs 10 extend beyond the body of the furniture replica and are tapped by tabs 11 creating a flat surface capable of being magnetically attracted to the magnetic surface below the grid ruled element 2 as shown in FIG. 1. Fold lines 8 form, in part, the corners of the furniture as well as the edges of the legs 10. The surface attached to flaps 9 represents the horizontal projection of the space occupied by the three dimensional furniture replica 3". Sheet 7, as shown in FIG. 2, contains a perforated shape representing such a horizontal projection which is similarly adapted to be magnetically responsive.

One of the advantages is a kit enabling the room planner to obtain a three dimensional view of the furniture models utilized in the planning process.

Another advantage is a furniture model which can be stored and sold in flat form and easily assembled into a three dimensional shape.

Still another advantage is a mating flat two dimensional representation of the horizontal projection of each piece of furniture being depicted by a fold up version into a three dimensional shape.

Yet another advantage is three dimensional and two dimensional furniture models with magnetically sensitive surfaces, permitting thereby, convenient and relocatable mounting facility to a magnetically sensitized mounting plate.

A further advantage is a kit having therein a number of ruled grid-like spacable elements containing perforations along the grid lines which facilitate convenient and rapid sizing of the grid to a scale representing accurately the dimensions of the room to be planned.

Another advantage is a book containing all the elements for a particular type of room to be planned such that each element may be removed from the book by perforations along the marginal edges of the furniture elements therein.

Still another advantage is a magnetic planning surface adaptable to be used in combination with a number of books, each of whom is styled to contain the furniture elements compatible with a variety of room styles to be planned.

Thus, there is disclosed in the above description and in the drawings, an embodiment of the invention which fully and effectively accomplishes the objects thereof. However, it will become apparent to those skilled in the art, how to make variations and modifications to the instant invention. Therefore, this invention is to be limited not by the specific disclosure herein, but only by the appending claims.

The embodiment of the invention in which an exclusive privilege or property is claimed are defined as follows:

1. A room planning kit comprising a planner mounting surface having first magnetic attraction means adapted to magnetically attract the lowermost lateral surfaces of a plurality of individual models, said models having a horizontal projection in proportion to the horizontal projection of the articles represented thereby, said models adapted to lie entirely in a plane when unfolded and to have surfaces lying in one or more of three planes normal to each other when folded, one of said three planes parallel to said lowermost lateral surface, said lowermost lateral surface having a second magnetically attractive means thereupon, means to selectively maintain said models in a folded three dimensional shape, means to removably apply a layout sheet having a plurality of grid lines thereupon intermediate said planner mounting surface and said lowermost lateral surfaces.

2. The room planning kit as claimed in claim 1 wherein said unfolded models are adapted with perforations delineating the marginal edges thereof from a sheet of material thereabout comprising said models extending beyond said marginal edges and lines of weakened material comprising said models within said models permitting folding of said material thereupon.

3. The room planning kit as claimed in claim 1 wherein said first magnetic attraction means comprises permanent magnets.

4. The room planning kit as claimed in claim 1 wherein said layout sheet comprises perforations along said grid lines permitting selective separation of a portion of said layout sheet from the remaining portions thereof.

5. The room planning kit as claimed in claim 1 further comprising a planner model having an outline proportional to the horizontal projection of the article represented thereby adapted with a third magnetic attractive means thereupon.

6. The room planning kit as claimed in claim 5 wherein said second and said third magnetic attraction means comprises printed magnetically sensitive particles upon said planer model and said lowermost lateral surfaces.

7. The room planning kit as claimed in claim 1 wherein said models further comprise tabs thereupon having pressure sensitive adhesive selectively located thereabout, said tabs covered with removable sheets of release material.

8. The room planning kit as claimed in claim 1 wherein a surface of said models are printed depicting the visual features of the article represented thereby.

9. The room planning kit as claimed in claim 1 wherein a quantity of said plurality of models are grouped in accordance with the intended use thereof of the articles represented thereby into the pages of a book.

10. The room planning kit as claimed in claim 5 wherein said planner models have marginal edges corresponding to said scaled horizontal projection.

* * * * *